Feb. 27, 1951  H. A. SWALLOW ET AL  2,543,307
PLASTIC MILLING APPARATUS

Filed Aug. 6, 1948  4 Sheets-Sheet 1

INVENTORS
HERBERT A. SWALLOW
HENRY H. ANDERSON
BY D. C. Harrison
ATTORNEY

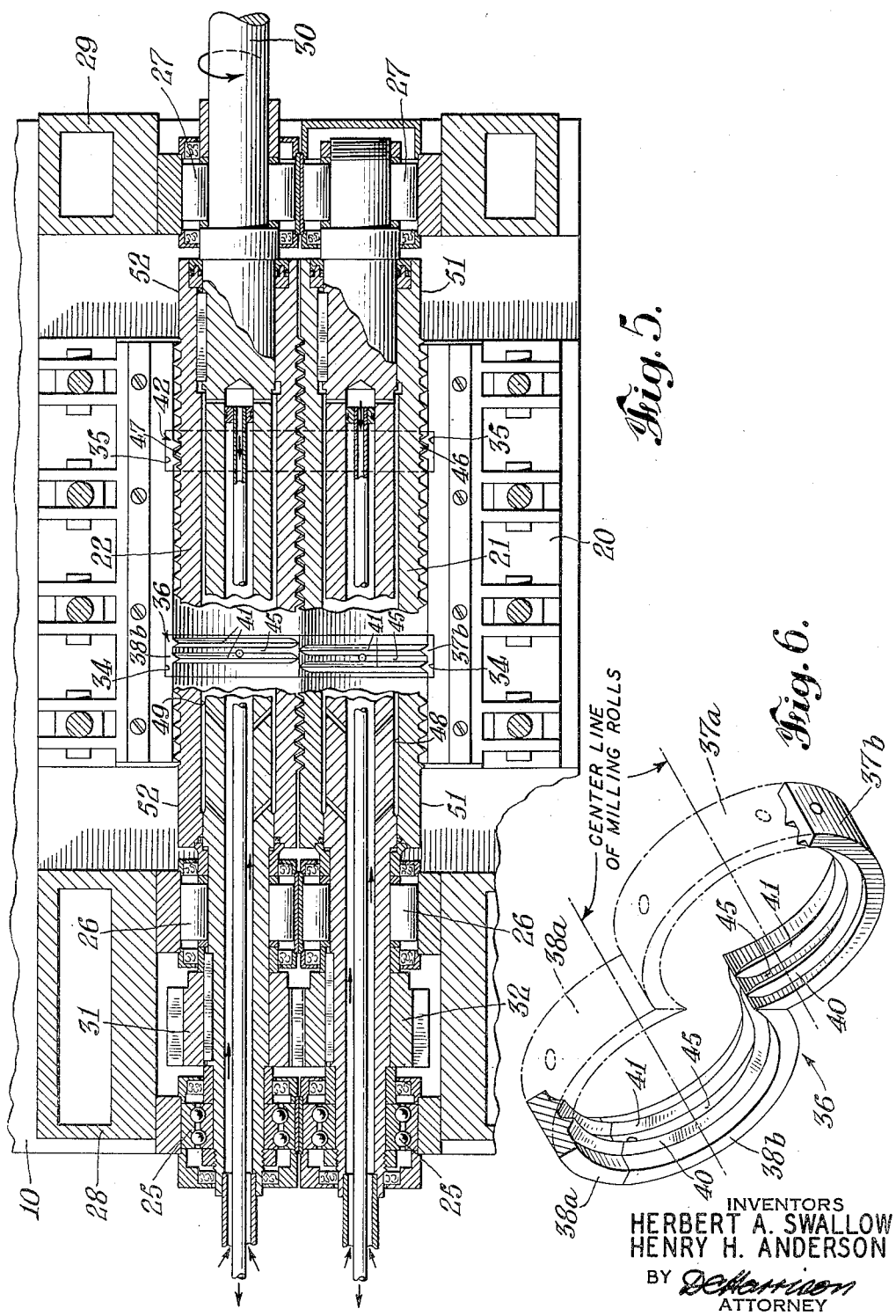

Feb. 27, 1951     H. A. SWALLOW ET AL     2,543,307
PLASTIC MILLING APPARATUS

Filed Aug. 6, 1948     4 Sheets-Sheet 3

INVENTORS
HERBERT A. SWALLOW
HENRY H. ANDERSON
BY D. C. Harrison
ATTORNEY

Feb. 27, 1951     H. A. SWALLOW ET AL     2,543,307
PLASTIC MILLING APPARATUS
Filed Aug. 6, 1948     4 Sheets—Sheet 4
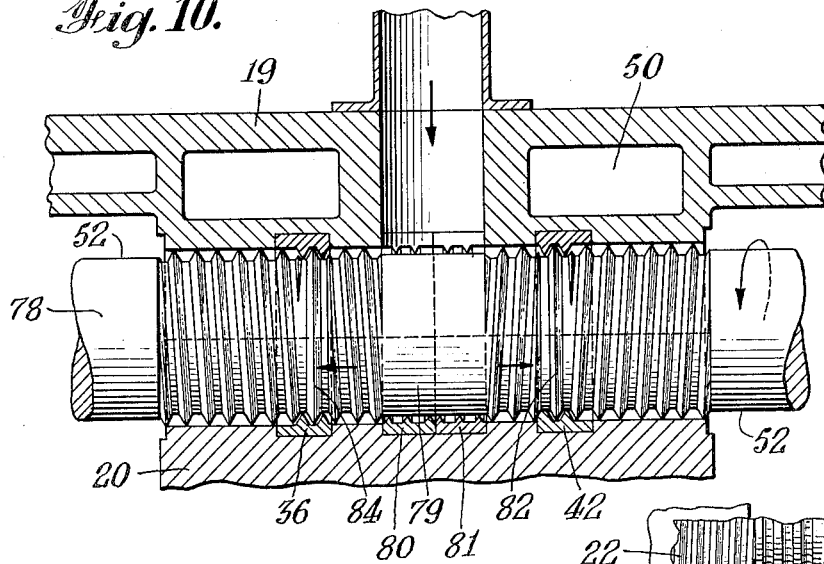
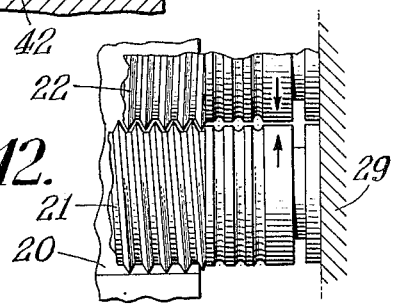
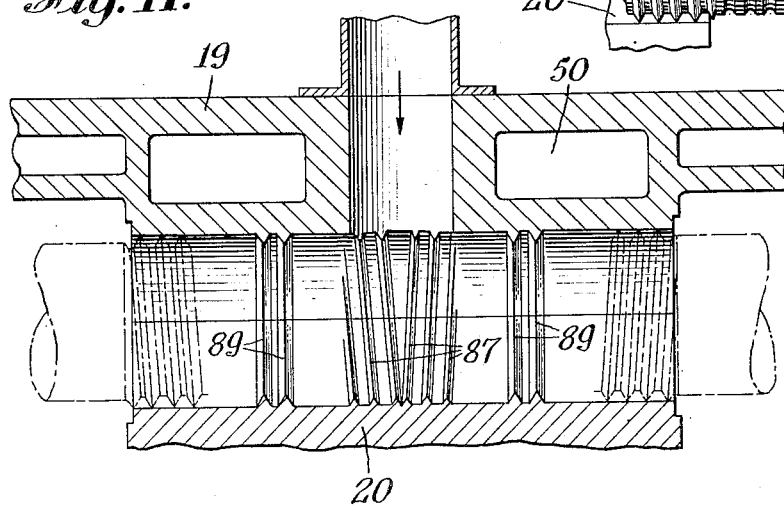
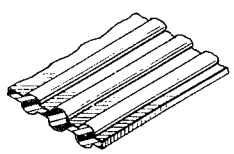
INVENTORS
HERBERT A. SWALLOW
HENRY H. ANDERSON
BY *D.C. Harrison*
ATTORNEY Patented Feb. 27, 1951

2,543,307

UNITED STATES PATENT OFFICE 2,543,307

PLASTIC MILLING APPARATUS

Herbert A. Swallow, Plainfield, and Henry H. Anderson, West Orange, N. J., assignors, by mesne assignments, to Union Carbide and Carbon Corporation, a corporation of New York Application August 6, 1948, Serial No. 42,778

6 Claims. (Cl. 18—2)

This invention relates to continuous milling and fluxing of plastic material, including thermoplastic and thermosetting resins, and compositions of such resins that contain fillers, plasticizers, pigments or other additions, and apparatus suitable therefor.

Heretofore it has been common practice to mill, mix, or flux plastic materials and compositions containing them on heated two-roll mills or in Banbury mixers. These procedures are essentially batch operations, since in the instance of two-roll mills a charge of plastic material more than sufficient to encircle after melting or fluxing one of the rolls is placed in the nip or bite of the rolls; during the milling the charge forms as a sheet about one of the rolls, and after the charge is sufficiently milled, the sheet is stripped. With a Banbury mixer, a charge is loaded therein, mixed, and then dumped. Neither apparatus and procedure are entirely satisfactory because in successive batches unavoidable variations occur in operating temperatures and in the mixing, fluxing and milling.

A process and apparatus for continuous milling or mixing of plastic materials is shown and claimed in U. S. Patent 2,434,707 issued January 20, 1948, to W. R. Marshall, the proper functioning of which depends on a radial clearance, in excess of mechanical clearance in the zone of intermesh between two V-type screw threaded rolls rotating in opposite directions through which the plastic passes. Such radial clearance offers no difficulty to the processing of plastic materials that are introduced to the apparatus as wet, viscous, or fluxed masses, and so adhere or cling to the helical threads and the grooves between the threads. But when unfluxed granular or powdered material, such as comminuted resins, pigment matter or fillers, is fed into the Marshall apparatus, those particles of material of smaller size than the radial clearance tend to drop through the zone of intermesh. Some of the particles are picked up by subsequent contact with material that has been fluxed and is adhering to the threaded roll surfaces to be milled and fluxed therewith. The remainder of the particles fail to be subjected to the milling or fluxing action of the intermeshing rolls and are discharged in an unaltered condition from the apparatus.

The present invention is directed to improvements of the continuous milling apparatus described in U. S. Patent No. 2,434,707, and it is particularly concerned with satisfactory continuous fluxing and milling of plastic materials introduced to the apparatus in granular, comminuted or finely subdivided form. The improved continuous milling apparatus of this invention is based on a pair of intermeshing V-type screw threaded rolls rotating in opposite directions within a closely confining housing, with the modification that the threads of each roll are interrupted by at least one non-helical annular section, or surface of revolution having a diameter the same as or less than the outer diameter of the screw threads, each annular section mating with the other and each cooperating with a semi-circumferential barrier projecting from the housing bore toward said surface of revolution, to form therewith a devious, tortuous passageway having a width of more than mechanical clearance. Unfluxed powdered plastic material, while being pushed through a devious passageway between such surface of revolution and projecting barrier, is pressed into intimate contact with previously fluxed material and intensively admixed therewith, by being subjected to multiple forces comprising pressing, shearing, and tearing actions, whereby the unfluxed material is completely fluxed and admixed with previously fluxed material before emerging from the restricted passageway for further milling and conveying by the intermeshing threaded rolls.

A further improvement of the invention comprises a continuous milling apparatus having a pair of intermeshing, V-type, screw-threaded rolls, each roll having a dual-thread, for instance, a right hand thread starting at one of the shaft ends of the roll and terminating about the longitudinal center or mid axial length of the roll to form a junction thereat with a left hand thread beginning there and terminating at the other shaft end of the roll. The dual-threaded rolls are supported by bearings solely at their shaft ends. Plastic material fed into such an apparatus at the mid-junction of the dual-threads is completely milled and fluxed upon reaching either shaft ends of the intermeshing rolls for discharge, without the plastic material having an opportunity to come into contact with or be entrapped by the bearings supporting the rolls.

These and other features of the invention are illustrated in the accompanying drawing in which Fig. 1 is a side elevation of a continuous milling apparatus having a positive feeding hopper for supplying plastic material at the mid-axial length of a pair of intermeshing dual-threaded rolls enclosed within the apparatus;

Fig. 5 is a horizontal section taken along the line 5—5 of Fig. 1;

Fig. 6 is a detailed perspective view of a matching pair of semi-circumferential housing inserts having V-shaped non-helical barriers;

Fig. 10 is a fragmentary longitudinal section showing a "driving" dual-(left and right hand) threaded roll embodying in one roll the two annular surfaces of revolution modifications shown in Figs. 7 and 8;

Fig. 11 is a view similar to Fig. 10 showing a dual-threaded roll having annular surfaces of revolution associated with annular and helical barriers formed integral with a housing confining intermeshing dual-threaded rolls;

Fig. 12 is a partial plan view showing a modified discharge surface on the end of the intermeshing threaded rolls for discharging a sheet having a ribbed or corrugated surface; and Fig. 13 is a detail perspective view showing a portion of a corrugated sheet of plastic material formed by the discharge means shown in Fig. 12.

Figure 1:
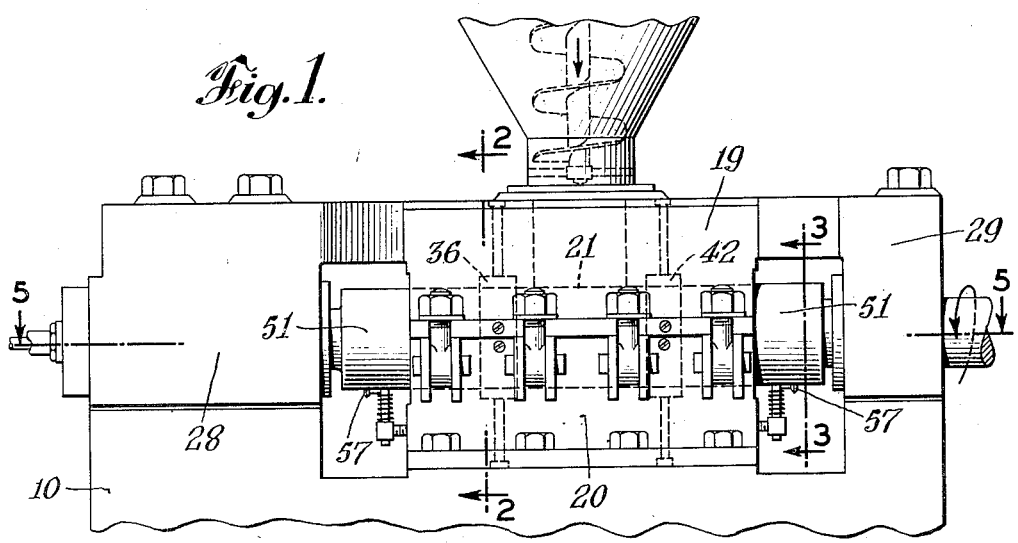
Figure 2:
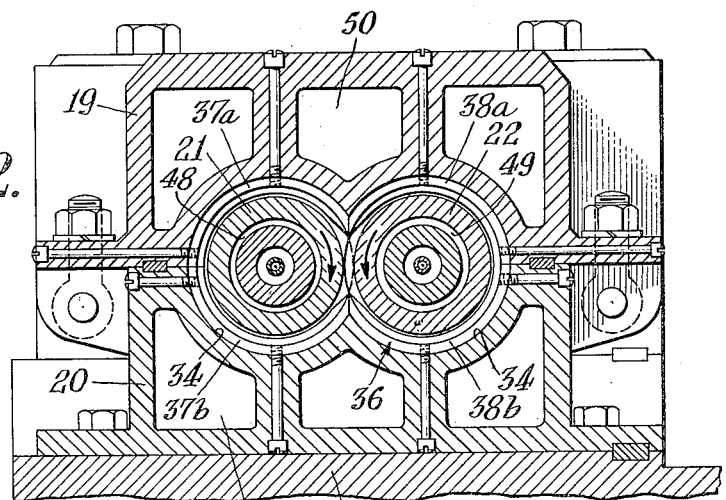
Fig. 2 is a vertical section taken on the line 2—2 of Fig. 1.

Referring now to the embodiment shown in Figs. 1 to 7 of the drawing, there is mounted on a base 10, a housing for a pair of intermeshing V-type threaded rolls, said housing comprising jacketed upper and lower saddle plates 19, 20 constructed of metal and suitably fastened together by eye bolts for maintenance convenience. The saddle plates 19, 20 as shown in Fig. 2 form a closely confining smooth wall, dual-bore housing for enclosing up to the zone of intermesh a pair of intermeshing dual-threaded rolls 21, 22 of cast iron, stainless steel or other constructional material of adequate strength and resistance to corrosion and abrasion. Half of the axial length of each roll has a left-hand or counterclockwise V-type thread and the other half has a right-hand or clockwise V-type thread, both threads terminating at a junction in the mid axial length of the roll. When positioned in the apparatus, the left hand thread of one roll meshes with the right hand thread of the other roll, and the right hand thread of the first roll meshes correspondingly with the left hand thread of the second roll.

The threaded rolls 21, 22 lie with their axes in a horizontal plane and are supported at their shaft ends by bearings 25, 26 and 27 positioned in bearing supports 28, 29, mounted on the base 10. The "driving" threaded roll 22 has an extended shaft 30 for coupling to a driving motor (not shown) for rotation in a counter clockwise direction. The "driving" roll 22 by means of gears 31, 32 fastened to shaft extensions at the left end of each threaded roll 21, 22, in turn cause the "driven" roll 21 to be positively rotated in a clockwise direction at the same peripheral speed as the driving roll 22.

Interior semi-annular slots or recesses 34, 35 are formed in the saddle plates 19, 20 and in each recess is bolted a pair of semi-annular metal inserts 36, 42 having projecting non-helical barriers. The paired insert assembly 36 for the left side of the apparatus is constructed in four sections, 37a, 37b, 38a, 38b for easier installation and is shown in detail in Fig. 6. If Fig. 6 is rotated 180° on its horizontal axis, it would illustrate the insert assembly 42 as installed on the right side of the apparatus. Each pair of semi-annular inserts 36, 42 has two inwardly projecting non-helical, semi-annular V-shaped projections or barriers 40, 41. The barriers 40, 41 of one of the pairs of the insert assemblies 36, 42 are in staggered relationship as to the barriers of the other in the paired assembly, to accommodate correspondingly staggered V-shaped annular surface of revolution 43, 44, 46, 47 on the intermeshing threaded rolls 21, 22. The annular surfaces of revolution 43, 44, 46, 47 rotate in the grooves 45 between the projecting semi-annular barriers 40, 41 on the insert assemblies 36, 42. The radial clearances between the staggered annular surfaces of revolution 43, 44, 46, 47 in the zone of intermesh as well as the clearances between each annular surface of revolution 43, 44, 46, 47 and the grooves of its corresponding inserts 36, 42 are more than mechanical clearance to provide a space for passage therethrough of material being milled and conveyed.

The saddle plate housings have jackets 50 for introduction therein of cooling or heating fluids. The threaded rolls 21, 22 as shown in Fig. 5 have cores 48, 49, to permit cooling or heating fluid to be circulated in the interior of the threaded rolls 21, 22 as operating conditions require.

The discharge ends of each threaded roll 21, 22 are provided with smooth annular surfaces 51, 52 against which are pressed plow cutter shaped knives 54, 55 to scrape off the discharged fluxed and milled material. The plow scrapers 54, 55 are particularly useful with thermosetting materials such as phenol aldehyde and urea-aldehyde resins which tend to stick to roll surfaces. Alternatively, rotary cutters 57, 58 may be used (particularly with thermoplastic vinyl materials which release more readily than thermosetting material from roll surfaces) to cut off milled material of definite width, providing a pull is exerted on the cut material to assist its release from the smooth annular surfaces 51, 52.

In the operation of the apparatus embodiment of Figs. 1 to 7, powdered material is fed to the threaded rolls 21, 22 from a feed hopper located over a central opening above the junction of the dual threads of each roll 21, 22. Preferably the feeding is continuous. Upon coming in contact with the threaded rolls 21, 22, the powdered material is drawn into the downward bite of the threaded rolls 21, 22 and then while being conveyed towards the discharge surfaces 51, 52 of the rolls, is repeatedly drawn through the bite of the rolls.

Figures 3, 4:
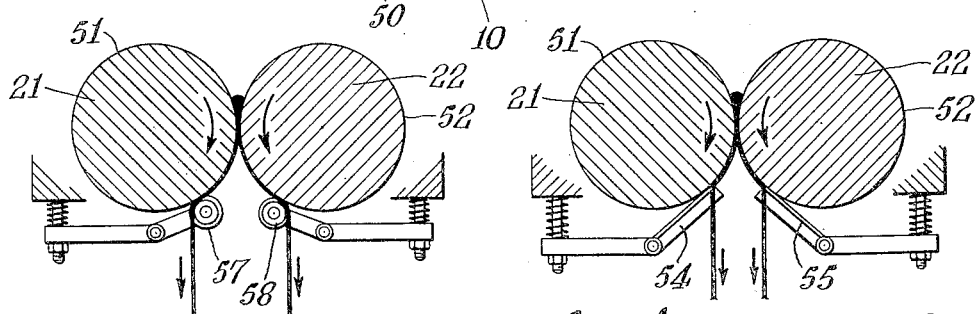
Fig. 3 is a vertical section taken on the line 3—3 of Fig. 1 showing a rotating cut-off wheel assembly for cutting into strip form the milled material discharged from threaded portions of the rolls onto smooth surfaces of the rolls.
Fig. 4 is a vertical section showing a cutter-plow knife modification for removing milled plastic material discharged onto smooth surfaces of the rolls.
Figure 7:
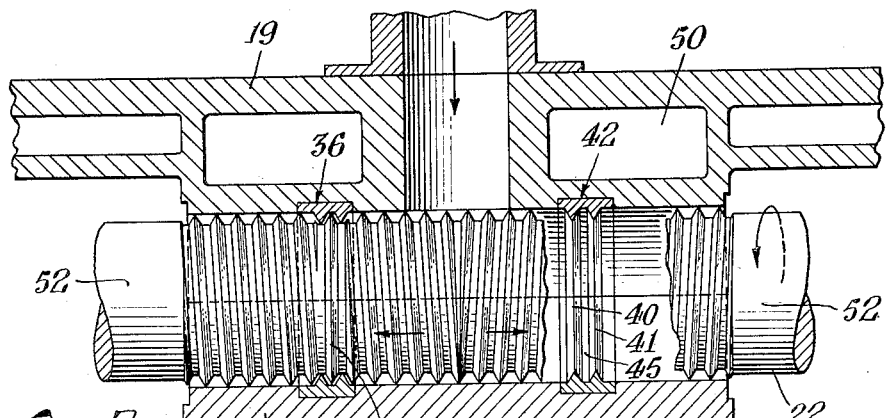
Fig. 7 is a fragmentary longitudinal section showing a "driving" dual left and right handed threaded roll, each thread being interrupted by an annular non-helical surface of revolution which is associated with the non-helical barriers of the semi-circumferential annular inserts shown in Fig. 6.

Some powdered material falls through the radial clearance in the zone of intermesh of the threaded rolls 21, 22 and is deposited on the floor of the bottom saddle plate 20, the amount depending upon the radial clearances between the threaded rolls 21, 22 and the fineness of the powdered material. Powdered material not falling through the radial clearance is fluxed and milled by repeated passage through the bite of the rolls. The frictional heat developed in milling as well as heat supplied by heating fluid introduced into cores 48, 49 of the threaded rolls 21, 22 initiates rapid fluxing of the meltable substances in the powdered material. The fluxed material adhering to the threads and being repeatedly drawn through the bite of the rolls picks up some of the powdered material lying on the floor of the lower saddle plate 29 and pushes the remainder unaltered in a direction towards the annular surfaces of revolution 43, 44, 46, 47, associated with the insert barriers 40, 41. Within the devious passageways between the barriers 40, 41 and the rotating annular surfaces of revolution 43, 44, 46, 47, the mixture of fluxed and unfluxed powder is subjected to intense pressures, shearing actions and tortuous flow. The combinations of these actions effectively mixes all the powdered material into a completely fluxed plastic mass devoid of unwetted nonmeltable substances (such as pigments or fillers) or of unfluxed resin particles. The fluxed mass upon emerging from the tortuous passage is then subjected to further milling action by the threaded rolls 21, 22 before discharge onto the smooth discharge surfaces 51, 52 of the threaded rolls 21, 22. The milled material is removed from the smooth roll surfaces 51, 52 by rotary or scraper knives as shown in Figs. 3 and 4 respectively.

Peripheral speeds between 60 and 180 feet per minute, for example by rolls of 6 inch pitch diameters are satisfactory for processing many types of plastic materials, such as the vinyl resins and thermosetting phenolic resins. Higher rotational speeds are feasible but require more driving energy, while lower speeds require less driving energy but with lower production rate of milled material. Similarly, but to a lesser extent, close radial clearances in the zone of intermesh between the threaded rolls 21, 22 (for example 0.005 inch) reduce the milling production rate, while larger radial clearances (for example 0.040 to 0.100 inch) increase milling production.

Figure 8:
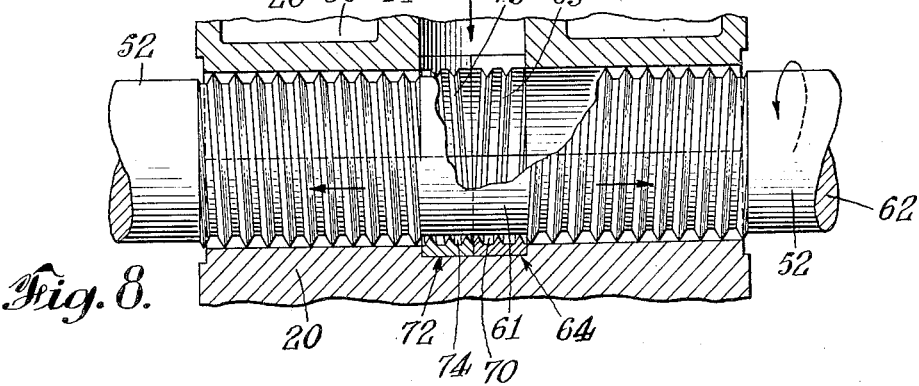
Fig. 8 is a fragmentary longitudinal section showing a "driving" dual-(left and right hand) threaded roll having in its center section a smooth annular surface of revolution, which is associated with V-shaped helical barriers positioned as an insert in saddle plates housing the dual threaded roll.
Figure 9:
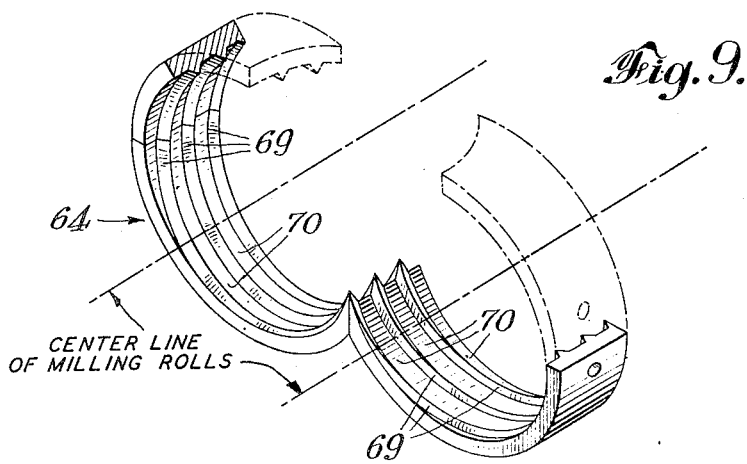
Fig. 9 is a detailed perspective view of a matching pair of semi-circumferential inserts having interior projecting helical V-shaped barriers, previously shown in assembly with a housing in Fig. 8.

In the embodiment of Figs. 8 and 9 the annular surface of revolution 61 is in the mid-length of a "driver" dual-threaded roll 62 (and is correspondingly located on the intermeshing "driven" roll not shown in Fig. 8). The annular surface of revolution 61 is essentially a smooth cylindrical surface. Associated with the cylindrical surfaces 61 of these rolls are two pairs of semi-annular saddle plate inserts 64, 72 having several parallel semi-helical barriers 69 separated by grooves 70. The grooves 70 between the semi-helical barriers 69 have smooth base floors. The barriers 69 and the grooves 70 of each insert pair meet each other at the bottom half of the inserts 64, 72 but are separated at the upper half to provide an opening for powdered material to enter into the bite between the smooth annular surfaces of revolution 61 on each of the threaded rolls.

The right hand pair of the semi-helical type inserts 64 is shown in perspective detail in Fig. 9. The direction of the spiral barriers 69 is such as to convey material to the dual threads on the right side of the apparatus when the rotation of the intermeshing threaded rolls is such as to effect a downward bite on material being milled. The left hand pair of semi-helical type inserts 72 has its semi-helical barriers 73 in a diametrically opposite direction to that of the right hand insert 64 whereby the former directs powdered material to the left side of the apparatus. The radial clearances between the smooth cylindrical surfaces of revolution 61 and the spiral barriers 69, 73 of each insert 64, 72 are closer to mechanical clearances than in the previous embodiment in order to delay the conveying of material, and favor repeated milling of material between the smooth annular surfaces of revolution 61 on the rolls.

The milling and fluxing of powdered material in the apparatus embodiment of Figs. 8 and 9 starts with introduction of powdered material into the nip or bite between the mating smooth cylindrical surfaces 61 of the threaded rolls. Some of the powder is immediately fluxed and adheres at once to the smooth roll surfaces 61 to form a rolling bank of fluxed material. The remainder of the powder falls through the bite between the smooth cylindrical surfaces 61 and is deposited in the grooves 70, 74 between the semi-helical barriers 69, 73. As fluxed material builds up on the smooth roll surfaces 61, it makes contact with the semi-helical barriers 69, 73 and is continuously pushed and guided thereby helically across the smooth roll surfaces 61 towards the intermeshing screw threads of the rolls. In the meantime unfluxed powdered material accumulates in the grooves 70, 74 between the spiral barriers 69, 73 until it attains a high enough level to make contact with the fluxed mass adhering to the smooth surfaces 61 on the rolls. Upon contact with the fluxed portion, the powdered material is picked up and masticated therewith on entering the bite of the smooth rolls and the resultant plastic mixture gradually is displaced onto the screw threaded portion of the rolls.

The embodiment shown in Fig. 10 is a combination of the two modifications previously illustrated and described. It comprises intermeshing dual threaded rolls, each having, as is illustrated for the "driving" roll 78 in Fig. 10, a smooth central annular or cylindrical surface of revolution 79 and interposed in each of the dual threads a V-shaped annular surface of revolution 82, 84. A pair of semi-annular inserts having semi-helical barriers 80 and 81 of the type shown in Fig. 9 confines, except for a feed opening, the central smooth annular surfaces of the revolution 79 on the roll 78. The V-shaped annular surfaces of revolution 82, 84 rotate within a groove provided between V-shaped semi-annular barriers in a pair of inserts of the type illustrated in Fig. 6.

In the embodiment shown in Fig. 11, semi-helical barriers 87 and semi-annular barriers 89 are formed integral with the upper and lower saddle plates. The mixing and milling action is the same as occurs in the embodiment of Fig. 10. The integral type of barrier construction dispenses with the joints inherent with the insert type of barriers into which plastic material may lodge if the machining of the inserts and corresponding recesses in the housing is not of precision accuracy. On the other hand, the integral type of construction is more expensive to machine and involves greater replacement cost upon ultimate wearing of the barriers.

The milled material discharged from any of the embodiments of the continuous milling apparatus may be removed therefrom as a continuous flat sheet as illustrated in Figs. 3 and 4. Other continuous shapes free from undercuts are also feasible, for instance a ribbed shape as illustrated in Fig. 13 is obtained by annular recessed surfaces on the discharge end of the threaded rolls as illustrated in Fig. 12.

We claim:

1. Apparatus for fluxing and milling plastic material comprising in combination a pair of parallel rolls having intermeshing left- and right-hand screw threads with a radial clearance in the zone of intermesh in excess of mechanical clearance to form a bite for milling the plastic, the screws threads of each roll being interrupted by at least one non-helical annular surface of revolution, said annular surfaces mating with each other and having a clearance therebetween in the mating area in excess of mechanical clearance for milling the plastic a housing closely confining said rolls, arcuate barriers projecting from said housing toward each of said annular surfaces of revolution and encircling the major portion of such annular surfaces to form therewith devious arcuate passageways in which the plastic material is fluxed and milled.

2. Apparatus for fluxing and milling plastic material comprising in combination a pair of parallel rolls having intermeshing left- and right-hand V-shaped screw threads with a radial clearance in the zone of intermesh in excess of mechanical clearance to form a bite for milling the plastic, at least one non-helical surface of revolution interrupting the screw threads of each roll and having a diameter less than the outer diameter of said screw threads, the non-helical surface on one roll mating with the non-helical surface on the other roll to provide a clearance therebetween at the mating area for milling the plastic a housing closely confining said rolls, individual barriers projecting from said housing toward each of said annular surfaces of revolution, each barrier encircling a major portion of one of the annular surfaces to form therewith devious passageways in which the plastic material is fluxed and milled.

3. Apparatus for milling and fluxing plastic material, comprising in combination a pair of parallel rolls having intermeshing left- and right-hand screw threads of a V-shape in axial cross-section for a major portion of the length of the rolls with a radial clearance in the zone of intermesh in excess of mechanical clearance to form a bite for milling the plastic, a non-threaded annular surface of revolution of a V-shape in axial cross-section interrupting the screw threads of each of said rolls and having a diameter not more than the outer diameter of said screw threads, said annular surfaces being in juxtaposition to each other with a radial clearance therebetween for milling the plastic, a housing having a smooth wall dual bore closely confining said intermeshing rolls, in each bore two spaced semi-annular barriers projecting from the bore toward the surface of revolution of the particular roll confined within the bore and encompassing a major portion of said surface, the annular surfaces of revolution rotating within the spaces between the semi-annular barriers with a clearance therebetween in excess of mechanical clearance for fluxing the material therein.

4. Apparatus for milling and fluxing plastic material comprising in combination a pair of parallel rolls having intermeshing left- and right-hand screw threads of a V-shape in axial cross section for a major portion of the length of the rolls with a radial clearance in the zone of intermesh in excess of mechanical clearance to form a bite for milling the plastic, a non-threaded smooth annular surface of revolution interrupting the screw threads of each of said rolls and mating with each other to form a milling bite for the plastic material, a housing having a smooth-wall dual bore closely confining said rolls, semi-helical barriers projecting from said housing wall and associated with a major circumferential area of the non-mating portions of said surfaces of revolution to provide a clearance therebetween for milling the plastic material.

5. Apparatus for conveying and milling plastic material comprising in combination a pair of dual screw threaded parallel rolls, each roll having intermeshing left- and right-hand screw threads of a V-shape in axial cross-section for a major portion of the length of the rolls with a radial clearance in the zone of intermesh in excess of mechanical clearance to form a bite for milling the plastic, a non-helical annular surface of revolution interrupting each of the left- and right-hand threads of each roll, a housing having a smooth-wall dual bore closely confining said rolls, the annular surface of one roll being positioned adjacent the annular surface of the other roll with a clearance therebetween for milling the plastic, and adjacent to each surface of revolution a semi-circumferential barrier projecting from said housing wall toward said surface of revolution and encircling a major circumferential portion of said surface to form therewith a passageway for fluxing and milling the plastic material.

6. Apparatus for milling and fluxing plastic material comprising a pair of parallel rolls having intermeshing left- and right-hand screw threads of a V-shape in axial cross section for a major portion of the length of the rolls with a radial clearance in the zone of intermesh in excess of mechanical clearance to form a bite for milling the plastic, mating grooved annular surfaces on the ends of said rolls, a non-helical annular surface of revolution interrupting the screw threads of each of said rolls said non-helical surfaces mating with each other with a clearance therebetween at the mating surfaces for milling the plastic, a housing having a smooth-wall dual bore confining said rolls, semi-annular barriers projecting from said housing wall toward said surfaces of revolution and substantially enclosing the non-mating areas of said surfaces to provide a passageway therebetween for milling and fluxing the plastic material.

HERBERT A. SWALLOW.
HENRY H. ANDERSON.

REFERENCES CITED

The following references are of record in the file of this patent:

UNITED STATES PATENTS

| Number | Name | Date |
|---|---|---|
| 1,935,050 | Gordon | Nov. 14, 1933 |
| 2,434,707 | Marshall | Jan. 20, 1948 |